United States Patent
Norefors et al.

(10) Patent No.: US 8,503,427 B2
(45) Date of Patent: Aug. 6, 2013

(54) LOCATION FUNCTIONALITY IN AN INTERWORKING WLAN SYSTEM

(75) Inventors: Arne Norefors, Stockholm (SE); Hakan Osterlund, Ekero (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 608 days.

(21) Appl. No.: 12/667,409

(22) PCT Filed: Jun. 30, 2008

(86) PCT No.: PCT/SE2008/050808
§ 371 (c)(1), (2), (4) Date: Dec. 31, 2009

(87) PCT Pub. No.: WO2009/005467
PCT Pub. Date: Jan. 8, 2009

(65) Prior Publication Data
US 2010/0182910 A1    Jul. 22, 2010

(30) Foreign Application Priority Data
Jul. 4, 2007 (SE) .................................. 0701627-2

(51) Int. Cl.
*H04W 4/02* (2009.01)
(52) U.S. Cl.
USPC .......................................... 370/351; 370/469
(58) Field of Classification Search
USPC ............... 370/351, 389, 392, 469, 474, 475
See application file for complete search history.

(56) References Cited

U.S. PATENT DOCUMENTS

| | | | | |
|---|---|---|---|---|
| 7,016,328 | B2* | 3/2006 | Chari et al. | 370/331 |
| 7,058,052 | B2* | 6/2006 | Westphal | 370/389 |
| 7,623,500 | B2* | 11/2009 | Riittinen et al. | 370/338 |
| 7,895,335 | B2* | 2/2011 | Watson, Jr. | 709/227 |
| 2006/0227758 | A1* | 10/2006 | Rana et al. | 370/351 |
| 2006/0268902 | A1* | 11/2006 | Bonner | 370/401 |
| 2007/0238448 | A1* | 10/2007 | Gallagher et al. | 455/414.2 |
| 2008/0120700 | A1* | 5/2008 | Pandey et al. | 726/4 |
| 2009/0216720 | A1* | 8/2009 | Piche et al. | 707/3 |
| 2009/0245202 | A1* | 10/2009 | Gras et al. | 370/331 |

FOREIGN PATENT DOCUMENTS
WO 2006/118495 A1 11/2006

OTHER PUBLICATIONS

3rd Generation Partnership Project. 3GPP TS 23.271 V7.8.0 (Mar. 2007). 3rd Generation Partnership Project; Technical Specification Group Services and Systems Aspects; Functional stage 2 description of Location Services (LCS) (Release 7). Mar. 2007.
ETSI. RES/TISPAN-02045-NGN-R2 V0.0.5. Telecommunications and Internet converged Services and Protocols for Advanced Networking (TISPAN); NGN Functional Architecture; Network Attachment Sub-System (NASS). 2006.

(Continued)

*Primary Examiner* — Michael Thier
*Assistant Examiner* — Curtis A Alia
(74) *Attorney, Agent, or Firm* — Coats & Bennett, P.L.L.C.

(57) ABSTRACT

The present invention relates to system nodes/entities and methods for enabling determination of the location of an attached User Equipment in a tunneled IP network. The User Equipment location can be determined by means of procedures maintained in a Location Function (LF). An application function can retrieve the User Equipment location by querying the Location Function by using the second source address as a key.

23 Claims, 9 Drawing Sheets

(56) References Cited

OTHER PUBLICATIONS

3rd Generation Partnership Project. 3GPP TS 23.234 V7.5.0 (Mar. 2007). Technical Specification Group Services and System Aspects; 3GPP system to Wireless Local Area Network (WLAN) interworking; System description (Release 7). 3GPP, Sophia Antipolis, France.

ETSI TS 123 060 V5.2.0 Jun. 2002. "Digital cellular telecommunications system (Phase 2+); Universal Mobile Telecommunications System (UMTS);General Packet Radio Service (GPRS) Service description; Stage 2". (3GPP TS 23.060 version 5.2.0 Release 5). European Telecommunications Standards Institute, Sophia Antipolis, France.

ETSI ES 282 004 V1.1.1 Mar. 2006. "Telecommunications and Internet converged Services and Protocols for Advanced Networking (TISPAN);NGN Functional Architecture; Network Attachment Sub-System (NASS)." ETSI Standard. European Telecommunications Standards Institute, Sophia Antipolis, France.

Droms, R. "Dynamic Host Configuration Protocol." IEFT Standards Track, Mar. 1997. RFC 2131. IEFT, Fremont, CA.

Rigney et al., "Remote Authentication Dial in User Service (RADIUS)." IEFT Standards Track, Jun. 2000. RFC 2865. IEFT, Fremont, CA.

\* cited by examiner

Standard

LOCATION FUNCTIONALITY IN AN INTERWORKING WLAN SYSTEM

TECHNICAL FIELD

The present invention relates to methods and function entities in a Interworking WLAN system architecture.

BACKGROUND

The present invention relates to Wireless Local Area Network (WLAN) Radio networks interworking with a 3GPP ($3^{rd}$ Generation Partnership Project) System. 3GPP-WLAN Interworking is used generically to refer to interworking between the 3GPP system and the WLAN family of standards. A WLAN that interworks with a 3GPP system is denoted Interworking WLAN (I-WLAN).

FIG. 1 illustrates an I-WLAN system architecture according to the prior art standard. WLAN 3GPP IP Access 25 allows WLAN User Equipments (UEs) 5 to establish connectivity with other IP networks, such as 3 G operator networks, corporate Intranets or the Internet via the 3GPP system. A WLAN Access Network 10 includes WLAN Access Points (AP). The system architecture involves an intermediate AAA (Authentication, Authorisation and Accounting) elements 40, and may additionally include other devices such as routers. The WLAN UE 5 includes all equipment that is in possession of the end user, such as a computer, WLAN radio interface adapter etc.

When an UE 5 is to access a IP Network 15, or a Private Network, this access may be provided via the WLAN 3GPP IP Access. The UE 5 sends its packet in an IP protocol that has to be tunneled through WLAN Access Network (AN) 10 and the 3GPP IP Access Network 25. Tunneling means that the IP packets that are transported in an Internet Protocol are transported in another protocol that is addressed with a local IP address.

A WLAN Access Gateway (WAG) 35 in the IP Access network 25 will route the data packet traffic through the WLAN 3GPP IP Access network. The function of said network element is described in reference 2, e.g. chapters 6.2.5.

When using WLAN Direct IP Access 12 directly to internet 15, a WLAN UE 5 needs to use its local IP (LIP) address only. In the other case, when using WLAN 3GPP IP Access 25, a WLAN UE 5 has to shall use two IP addresses: its local IP (LIP) address and a remote IP (RIP) address. For the WLAN assigned LIP address, which belongs to the address space of WLAN AN, there is no additional requirement on the WLAN. When using WLAN 3GPP IP Access, a WLAN UE's RIP address identifies the WLAN UE in the network that the WLAN UE is accessing for the 3G PS (Packet Switched) service. It shall be used for the inner packet of the WLAN UE-initiated tunnel. It can be assigned by the Home Public Land Mobile Network (HPLMN), Visited PLMN (VPLMN) or another IP network. The RIP address can be statically or dynamically assigned. The only case where VPLMN assigns the RIP address for the WLAN UE is when the WLAN UE-initiated tunnel terminates at the VPLMN's Packet Data Gateway (PDG). When the WLAN UE's RIP address is allocated by a second IP network, the PDG is required to have an interface with an address allocation server, such as AAA or Dynamic Host Configuration Protocol (DHCP), belonging to the IP network. For the WLAN UE's RIP address, IPv4 addresses shall be supported. When the WLAN UE accesses 3G PS based services using an IPv6 network such as IMS services, IPv6 addresses shall be supported for the WLAN UE's RIP address. When a WLAN UE accesses several 3G PS based services with different W-APNs simultaneously, the WLAN UE can get several RIP addresses. There may be several WLAN UE-initiated tunnels for the services.

The determination of the location of an attached User Equipment in a tunneled IP network such as an I-WLAN is not yet possible, even though TISPAN has specified procedures for position determination of an IMS user based on the remote (PDP) IP address also when the 3GPP IP access as specified is used. The problem is that there is no binding/associating of the local IP address and its associated geographical information to the WLAN UE remote IP address in the case of a WLAN UE that is attached via an I-WLAN to a another, second IP network or Internet.

SUMMARY

The object of the present invention is to provide methods and entities supporting binding/associating of the local IP address and its associated geographical information to the WLAN UE remote IP address even in the case when a WLAN UE is attached via an I-WLAN to another IP network or Internet, and for making it possible to determine the location of a User Equipment attached to a tunneled IP network.

This object is solved by the independent claims. The dependent claims describe further embodiments.

A method is provided for determination of the location of an attached User Equipment to a tunneled IP network. The User Equipment location can be determined by means of procedures that are equal or similar to the procedures described in TISPAN NASS and maintained in a Location Function (LF). The location function maintains a correlation between the user equipment and a first source address of the User Equipment in a first IP network. The Location function is updated with a second source address of the user equipment in a second IP network in context of the first source address so that the Location function can correlate the first source address with the second source address and so that an application function can retrieve the User Equipment location by querying the Location Function and by using the second source address as a key.

The tunneled IP network may comprise a Tunnel Termination Function (TTF) that is configured to update the Location Function.

Further one method for associating a first source address and a second source address in a tunneled IP network is provided. A Connectivity session Location and repository Function (CLF) is configured to receive a User Equipment (UE) local IP address as a first source address. The CLF is further configured to receive a remote IP address as a second source address. In the method the local IP address and geographical information are stored in the CLF as part of local IP address allocation. Further, the local IP address and the remote IP address are received from one Tunnel Termination Function entity. The stored local IP address is identified by means of the received local IP address and associating/binding the received remote IP address to the geographic information corresponding to the stored local IP address.

In one embodiment of the present invention, the TTF entity is a Tunnel Termination Gateway (TTG) entity, and the local IP address and remote IP address are received from the TTG in a protocol, e.g. Radius (a4), DHCP (a2) or other protocol.

In another embodiment of the present invention, the TTF entity is a Tunnel Termination Gateway (TTG) entity, and the local IP address and remote IP address are received from a Gateway GPRS Support Node (GGSN) entity and/or node via an User Access Authorisation Function (UAAF) proxy in protocol, e.g. a Radius (a4) protocol.

In one embodiment of the present invention, the TTF entity is a Packet Data Gateway (PDG) entity, and the local IP address, and remote IP address are received in a protocol, e.g. a Radius (a4), DHCP (a2) or other protocol.

Further one method for providing a Connectivity session Location and repository Function (CLF) of a tunneled IP network with a User Equipment's (UE) local IP address as first source address and a remote IP address as second source address for said UE from a Tunnel Termination Function (TTF) entity in a TTG node, or a PDG node is provided by the present invention. The UE's local IP address is received as source address when the IPsec tunnel is established. Then, the UE's remote IP address is allocated according to any standard procedure. The local IP address and the remote IP address are forwarded to the CLF in at least one protocol.

In further one method a Connectivity session Location and repository Function (CLF) of a tunneled IP network with is provided with a User Equipment's (UE) local IP address as first source address and a remote IP address as second source address for said UE from a GGSN node. The UE's local IP address is received as source address when the IPsec tunnel is established. Then, the UE's remote IP address is allocated according to any standard procedure. The local IP address and the remote IP address are forwarded to the CLF in a protocol.

For solving the stated object, a Connectivity session Location and repository Function (CLF) means is provided, wherein said CLF means is configured for associating a first source address and a second source address in a tunneled IP network is also provided. The CLF means is configured to receive a User Equipment's (UE's) local IP address as a first source address and geographical information about the UE. It is also configured to receive a remote IP address for said UE as a second source address, and that it is further configured with a storage for storing the local IP address and geographical information about the UE in the CLF means as part of local IP address allocation, e.g. according to TISPAN specified procedures, and communication means for receiving the local IP address, geographical information about the UE and the remote IP address in from one Tunnel Termination Function entity, and means for identifying the stored local IP address by means of the received local IP address and associating/binding the received remote IP address to the geographic information corresponding to the stored local IP address.

In addition, a Tunnel Termination Function (TTF) entity is provided, wherein the TTF entity is a TTF node comprising a means for providing a Connectivity session Location and repository Function (CLF) of a tunneled IP network with a User Equipment's (UE's) local IP address as first source address and a remote IP address for said UE as second source address. The means is configured with communication means for receiving the UE's local IP address as source address when the IPsec tunnel is established, allocating the UE's remote IP address, and for forwarding the local IP address and the remote IP address to the CLF in at least one protocol.

Further, a Gateway GPRS Support (GGSN) node entity is provided, which node comprises means for providing a Connectivity session Location and repository Function (CLF) means of a tunneled IP network with a User Equipment's (UE's) local IP address as first source address and a remote IP address for the UE as second source address. The means is configured with communication means for receiving the UE's local IP address as source address when the IPsec tunnel is established, allocating the UE's remote IP address, and forwarding the local IP address and the remote IP address to the CLF means in at least one protocol.

The advantage with this invention is that an existing fixed network positioning solution based on a Connectivity Session Location and Repository Function (CLF) can be used also when IP traffic is tunneled to an application server. An additional advantage is that no additional terminal functions, such as Global Positioning System (GPS) support, are needed.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced and other embodiments that depart from these specific details. In other instances, detailed descriptions of well known methods, devices, and circuits are omitted so as not to obscure the description of the present invention with unnecessary detail.

Figure 1:
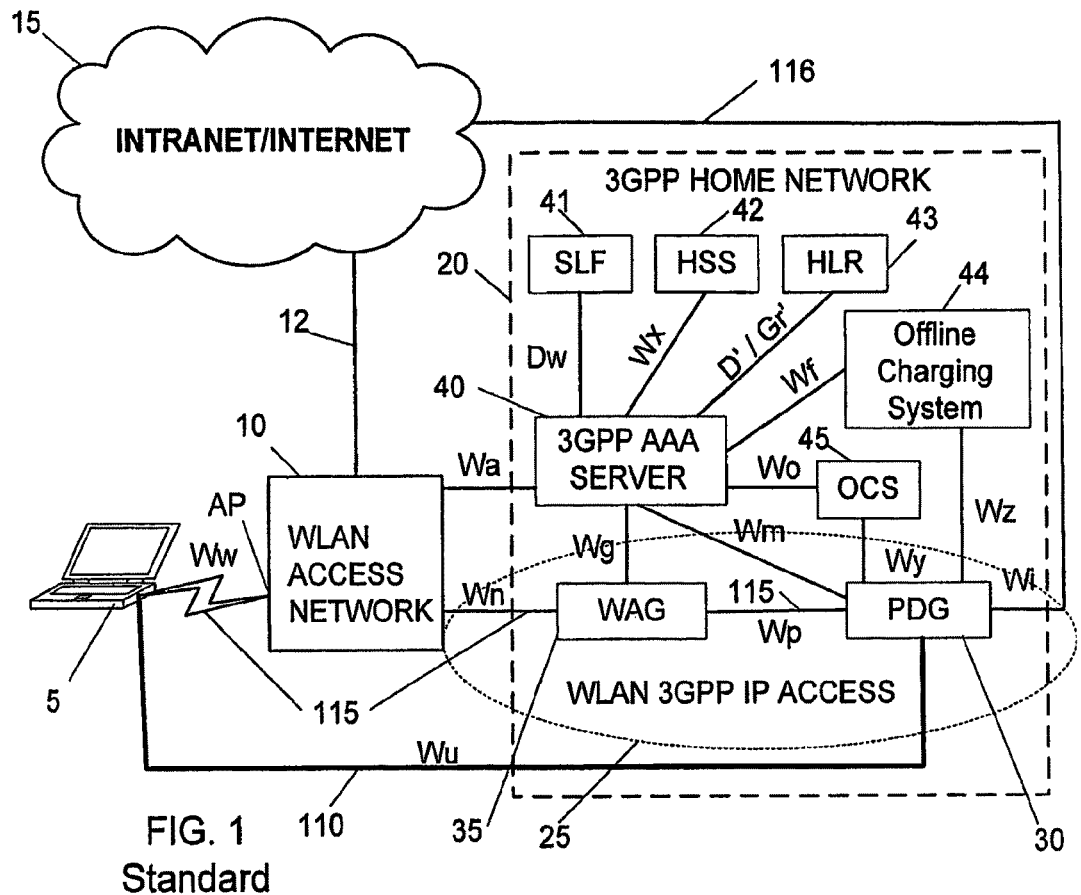
FIG. 1 is a block diagram schematically illustrating a system architecture according to the prior art standard.

FIG. 1 is a block diagram schematically illustrating a system architecture according to the prior art standard. Reference has been made to FIG. 1 in the "BACKGROUND" section of this document. Said system is described in more detail in reference 2 (Ref.2) (3GPP TS 23.234 V7.5.0 (2007): see figure 6.1, page 29. The function of the different network elements is further described in the same reference, see chapter 6.2.

A WLAN UE 5 is the User Equipment using a UICC card utilized by a 3GPP subscriber to access the WLAN AN 10 for 3GPP interworking purpose. The WLAN UE 5 may be capable of WLAN access only, or it may be capable of both WLAN and 3GPP radio access, or both simultaneously. A WLAN UE 5 may include terminal types whose configuration, e.g. interface to a UICC, operation and software environment are not under the exclusive control of the 3GPP system operator, such as a laptop computer or PDA with a WLAN card, UICC card reader and suitable software applications. The WLAN UE functions include:

Associating to an I-WLAN;
        Obtain a local IP address. If the WLAN UE 5 is intended for use with WLAN ANs supporting IPv4 only as well as with WLAN ANs supporting 'IPv6 only, it has to be equipped with a dual IP stack.

For WLAN 3GPP IP Access enabled UE is assumed following:

Establishing a secure tunnel to a PDG 30.
    Obtain a remote IP address.

The 3GPP AAA Server 40 is located within the 3GPP home network 20 of a subscriber and it is intended to communicate with different network entities, e.g. the 3GPP AAA Proxy that represents a proxying and filtering function that resides in a visited 3GPP network. Said server 40 retrieves authentication information and subscriber profile (including subscriber's authorization information) from the HLR/HSS 43/42 (Home Location Register 43/Home Subscriber Server 42) of the 3GPP subscriber's home 3GPP network 20.

The HLR/HSS 43/42 located within the 3GPP subscriber's home network 20 is the entity containing authentication and subscription data required for the 3GPP subscriber to access the WLAN interworking service. Besides other information, the HSS 42 contains 3GPP WLAN QoS profiles' authentication and subscription data for the 3GPP subscriber. The HSS 42 also provides access to the WLAN UE's WLAN-attach status for other entities, e.g. answers or relays the WLAN-attach status query from other entities. To this end, the HSS 42 shall store the IP address of the 3GPP AAA server to which the WLAN UE 5 is registered.

The Subscription Locator Function (SLF) 41 is located within the 3GPP subscriber's home network and enables the 3GPP AAA Server 40 to find the address of the HSS which holds the subscriber data for a given user identity in a configuration with multiple separately addressable HSS'es. The SLF 41 should be used in the same way for WLAN as for IMS (IP Multimedia Sub-system).

The Online Charging System (OCS) 45 and the Offline Charging System 44 are located within the 3GPP network. The OCS 45 and the Offline Charging System 44 are not of special interest for the following invention, and said elements will not be described in more detail. For details about OCS 45, reference is made to the standard document TS 32.296, and for details about the Offline Charging System 44, reference is made to the standard document TS 32.252.

The different Reference Points Dw, Wx, D'/Gr', Wf, Wo, Wa, Ww, Wn, Wu, Wg, Wm, Wp, Wy, Wz, and Wi are described in reference 2, to which document reference is made for providing more details.

The Wu reference point is located between the WLAN UE 5 and the Packet Data Gateway (PDG) 30. It illustrates the WLAN UE-initiated tunnel 110 between the WLAN UE 5 and said PDG 30. Transport for the Wu reference point protocol is provided by the Ww, Wn, and Wp reference points, together establishing the path 115 which ensure that the data are routed via the WAG 35 where routing enforcement is applied to the PDG 30, and then to the internet via the route path 116. The functionality of the Wu reference point is to enable:

WLAN UE-initiated tunnel establishment;
    User Data packet transmission within the WLAN UE-initiated tunnel; and
    Tear down the WLAN UE initiated tunnel.

3GPP Packet Switched (PS) based services are accessed via the PDG. Said services may be accessed via a PDG 30 in the user's Home Network or a PDG in the selected VPLMN. The resolution of the IP address of the PDG providing access to the selected service will be performed in the PLMN functioning as the home network. If the PDG 30 is intended to support connections from WLAN UEs using IPv4 and IPv6 local addresses, it shall be equipped with an dual stack. Successful activation of a selected service results in:

Allocation of a WLAN UE's remote IP address RIP to the WLAN UE 5;
    Registration of the WLAN UE's local IP address LIP with the data Packet Data Gateway 30 and binding of said address with the WLAN UE's remote IP address.

The PDG 30 contains routing information for WLAN-3G connected users and is therefore able to route the packet data from said users. It is also able to perform address translation and mapping. It is able to perform de-capsulation and encapsulation. It also allows allocation of the WLAN UE's RIP address. Further, it performs registration of the WLAN UE's LIP address and binding of this address with the WLAN UE's RIP address.

Figure 2:
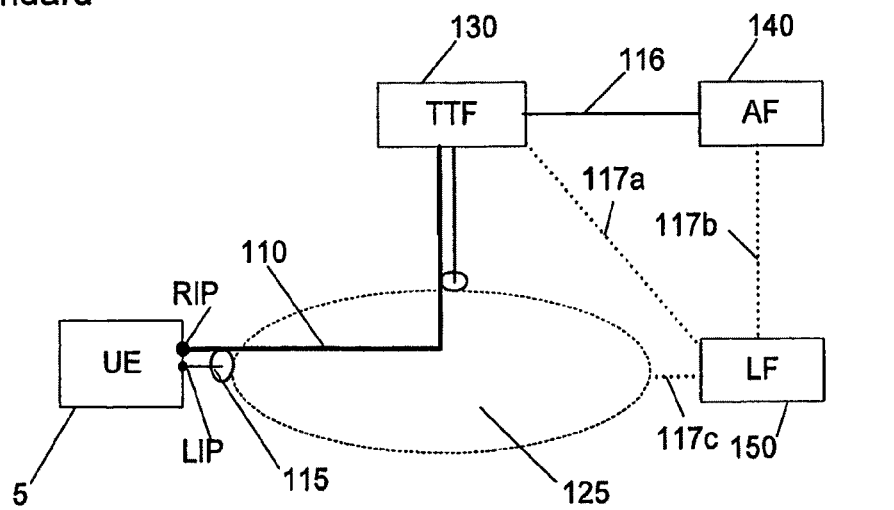
FIG. 2 is a block diagram schematically illustrating a system architecture according to the present invention.

FIG. 2 is a block diagram schematically illustrating a system architecture according to the present invention. The present invention provides a method for determination of the location of an User Equipment (UE) 5 attached to an IP network 125. When an UE 5 is to access another IP Network, or a Private Network, this access may be provided via WLAN 3GPP IP Access 125. The UE sends its packet in an IP protocol that has to be tunneled via tunnel 110 (comprising IP packets on path 115) to the Tunnel Termination Function (TTF) 130 and further transmitted to a requested Application Function (AF) via path 116. The IP packets are transported in another protocol that is addressed with a local IP (LIP) address. The procedure of establishing a UE-initiated tunnel 110 is described in more detail in reference 2 [3GPP issued standard document TS 23.234 V7.5.0 (2007-03)]. A Tunnel Termination Function TTF 130 receives a UE LIP address as source address when an IP tunnel 110 for data packet traffic to a second, IP network is established. Said UE LIP address is denoted first source address as it belongs to a first network 125. The UE LIP address and location is stored in the Location Function LF 150. This can be done as a part of the LIP address allocation procedure. In one step of the invented method, the location function 150 maintains a correlation between address information related to the UE 5 and the first source address LIP of the UE 5 in the first IP network 125. In further one step of the method, the tunnel termination function 130 updates the LF 150 via a signalling path 117*a* with a second source address, or remote IP (RIP) address, for the UE 5, which address belongs to a second IP network, in context of the first source address so that the LF 150 can correlate the first source address LIP with the second source address RIP, i.e. the UE tunnel IP address. Thus, the TTF 130 forwards the UE LIP address and UE tunnel IP address to the LF 150. The LF 150 is configured to correlate the UE tunnel IP address with the geographical location by use of the UE local IP address. Due to the correlation between the first and second source addresses, an Application Function (AF) 140 in another IP network e.g. in a IP Multimedia Sub-system (IMS), is enabled to retrieve the geographic location of UE 5 by querying the LF 150 via the signalling path 117*b* and by using the second source address RIP, i.e. the UE tunnel IP address, as a key. Components in network 125 are able to establish communication with the Location Function 150, here illustrated as a signalling path 117*c*.

The geographic location of the UE 5 can be determined by means of procedures that are equal or similar to the procedures described in TISPAN NASS (see Ref.1) and maintained in a Location Function (LF) 150.

In the following description of different embodiments of the invention, the Location Function will be denoted Connectivity Session Location and Repository Function (CLF).

Figure 3:
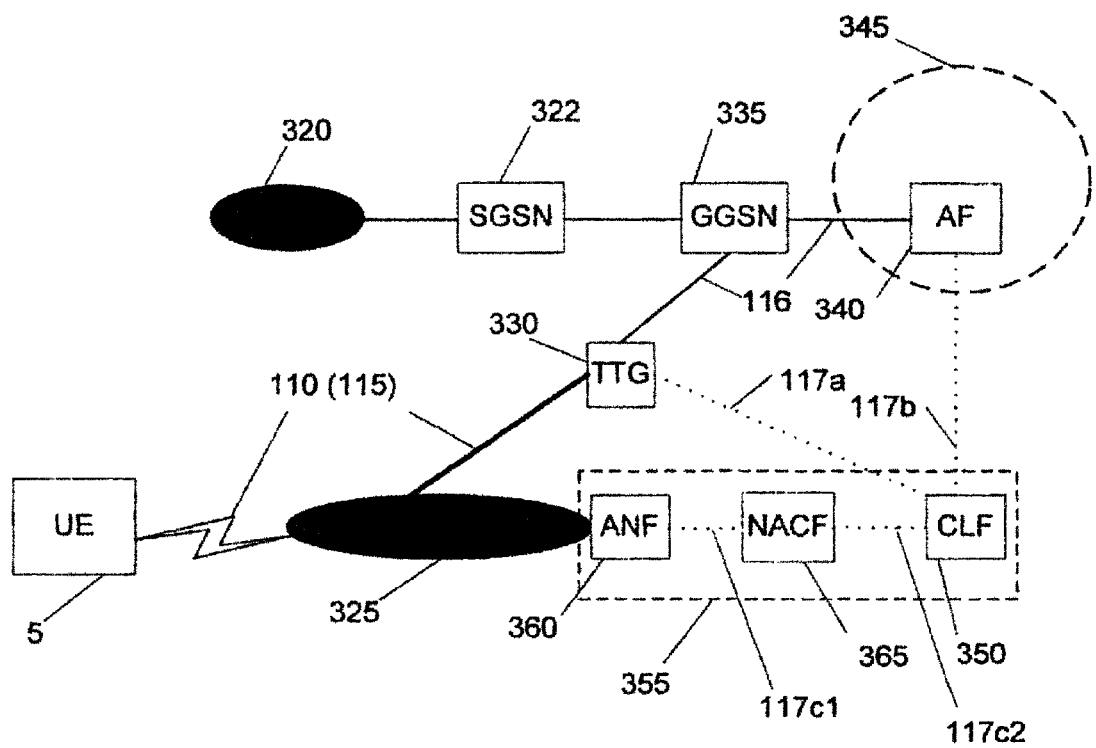
FIG. 3 is a block diagram illustrating a system architecture according to one embodiment (TTG based) of the present invention.

FIG. 3 illustrates a system architecture wherein one embodiment of the present invention is applicable. This embodiment is based on the Tunnel Termination Gateway (TTG) node of a system 300. In the following the different nodes and functions of the illustrated system will be described in more detail with reference made to FIGS. 1, 2 and 3.

A User Equipment 5 is able to attach to an Access Point node of a Wireless Local Access Network (WLAN) Access Network (AN) 325. The WLAN AN 325 may operate according to a Digital Subscriber Line (DSL) Technology. The system architecture comprises also Radio Access Network (RAN) 320 for enabling access for User Equipment 5 operating according to other mobile radio telecommunications standards, e.g. GSM standards (e.g. 2G, 3G, EDGE) or UMTS (e.g. WCDMA, CDMA2000, etc). An SGSN (Serving GPRS Support Node) 322 is connected to the system for supporting the data packet communications between Internet/Intranet systems and UEs, which are attached to the RAN 320. The WLAN AN, RAN and SGSN is not important for the understanding of the invention and will therefore not be described in more detail.

The User Equipment (UE) 5 may be a personal computer, mobile cellular phone, PDA (Personal Digital Assistant), etc comprising radio equipment/interface for wireless communication over the air interface with the radio interface of the Access Point of the WLAN AN 325. As mentioned in the technical background above, a WLAN UE needs only to use its local IP address LIP, when using WLAN Direct IP access. When using WLAN 3GPP IP Access, a WLAN UE shall use both the its local IP address LIP and remote IP address RIP. The WLAN UE is further described in Reference 2, e.g. chapter 6.2.1.

The TTG 330 is able to relay the WLAN UE's remote IP address allocated by an external IP network to the WLAN UE, when external IP network address allocation is used.

The Gateway GPRS Support Node (GGSN) entity/node 335 is a network node that acts as a gateway between a GPRS wireless data network and other networks such as the Internet or private networks. The GGSN 335 is the anchor point that enables the mobility of the user terminal in the GPRS/UMTS networks. It carries out the role in GPRS equivalent to the Home Agent in Mobile IP. It maintains routing necessary to tunnel the Protocol Data Units (PDUs) to the SGSN 322 that service a particular MS (Mobile Subscriber). Other function include subscriber screening, IP Pool management and address mapping, QoS and PDP context enforcement.

The user of the UE is able to call and use a requested service provided by different Application functions 340 within the Internet 345, or other IP network, via paths 110(115) and 116. The CLF 350 responds to location queries from the application functions 340 and/or service control subsystems, via signalling path 117*b*. The actual information delivered by the CLF may take various forms, e.g. network location, geographical coordinates, post mail address etc.

The system architecture is also provided with a Telecommunications and Internet converged Services and Protocols for advanced Networking (TISPAN) and Network Attachment Sub-System (NASS) 355, which is abbreviated TISPAN NASS and defined in ETSI standard document ETSI ES 282 004 v1.1.1 (2006-6) [Ref. 1]. The NASS 355 provides the following functionalities:

Dynamic provision of IP address and other user equipment configuration parameters (e.g. using DHCP);
User authentication, prior or during the IP address allocation procedure;
Authorization of network access, based on a user profile;
Access network configuration, based on user profile; and
Location management.

The NASS 355 comprises at least the following functional entities:

Network Access Configuration Function (NACF) 365;
Access Management Function (AMF) 360;
Connectivity Session Location and Repository Function (CLF) 350;
User Access Authorization Function (UAAF) 370.

One or more functional entities may be mapped onto a single physical entity. Functional entities in the NASS may be distributed over two administrative domains.

The NACF 365 is responsible for the local IP address allocation to the UE. It may also distribute other configuration parameters such as address of DNS server(s), address of signalling proxies for specific protocols (e.g. address of a Proxy Call Session Control Function (P_CSCF) node when accessing to the IMS). This information uniquely identifies the access network to which the UE is attached. With this information applications should be able to locate the CLF 350. DHCP servers or RADIUS servers are typical implementations of the NACF 365. For more details, see Reference 1, e.g. chapter 5.2.1.

The Access Management Function (AMF) 360 translates network access requests issued by the UE. It forwards the requests for allocation of an IP address and possibly additional network configuration parameters to/from the NACF via path 117*c*1. For more details, see Reference 1, e.g. chapter 5.2.2.

The Connectivity Session Location and Repository Function CLF 350, corresponding to Location Function (LF) 150 in FIG. 2 registers the association between the IP address allocated to the UE and related network location information provided by the NACF. The CLF registers the association between network location information received from the NACF and geographical location information. The CLF 350 responds to location queries from service control subsystems 345 and applications 340. The actual information delivered by the CLF may take various forms, e.g. network location, geographical coordinates, post mail address etc. The CLF interfaces with the NACF 365 via path 117*c*2 to get the association between the local IP address allocated by the NACF to the end UE and the Line ID. For more details, see Reference 1, e.g. chapter 5.2.3.

When the UE 5 makes a DHCP (Dynamic Host Configuration Protocol) Request, the UE will get an IP-address. In the WLAN access point is located a DHCP Relay Agent. Said Agent puts a field, Option 82, in the DHCP request. The request is transferred to a DHCP server, that reserves and dedicates an IP address to the UE. The DHCP server manages and maintains a list comprising MAC-address and the Option 82 value. Further, the IP address of a Proxy-CSCF server is also listed in the list. As an example, the string in the Option 82 header may look like following "line 7 con 35". The system has now information stored which IP-address that is associated to which Option 82 string. As the system is aimed to support TISPAN NASS, further one interface is added in the architecture. Said interface is situated between the DHCP server and the CLF server. Through this interface, signalling path 117a, the DHCP informs the CLF about the out-leased IP-address and the associated Option 82 parameter string.

According to the invention, the CLF 350 is provided with the following features:

CLF can be accessed from IMS;
CLF uniquely gives one location based on remote IP address (no overlapping (private) DSL IP addresses are allowed);
The CLF is extended to store remote IP address;
The same operator runs the DSL (Digital Subscriber Line) network as the mobile network or there is a agreement to use CLF from both the mobile and DSL system.

Figure 4:
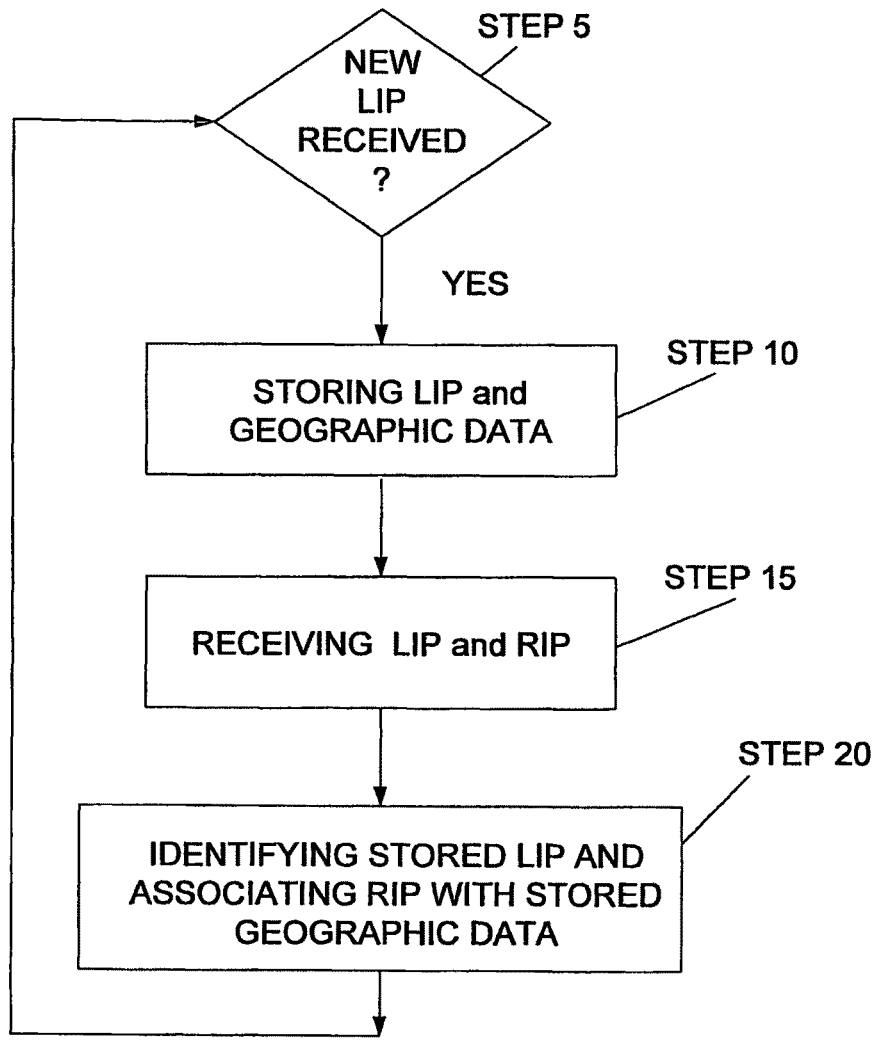
FIG. 4 is a flowchart diagram illustrating an invented method for associating IP addresses.

The CLF is configured to receive the UE local IP (LIP) address as a first source address and the UE remote IP (RIP) address as second source address. The RIP address allocation is performed according to GGSN standard procedures described in e.g. Reference 5, chapter 9.2.1. The invented method is illustrated in a flowchart in FIG. 4. The present invented method comprises following steps of:

storing the local IP address and geographical information about the UE in CLF as part of local IP address allocation according to TISPAN specified procedures (step 10);
receiving the local IP address and the remote IP address as a protocol element, e.g. in DHCP (ref3) or Radius (ref4) (step 15);
identifying the stored local IP address by means of the received local IP address and associating/binding the received remote IP address to the geographic information about the UE corresponding to the stored local IP address (step 20).

The method will wait for a new LIP to be received in step 5. When a LIP is received, the condition is fulfilled, "yes", and the method will restart with step 10.

The invented method for associating the UE local IP (LIP) address and the UE remote IP (RIP) address in the CLF, and further associating/binding the received remote IP address to the geographic information about the UE corresponding to the local IP address is common for the three different embodiments of TTF configuration that in the following will be described.

Figure 5:
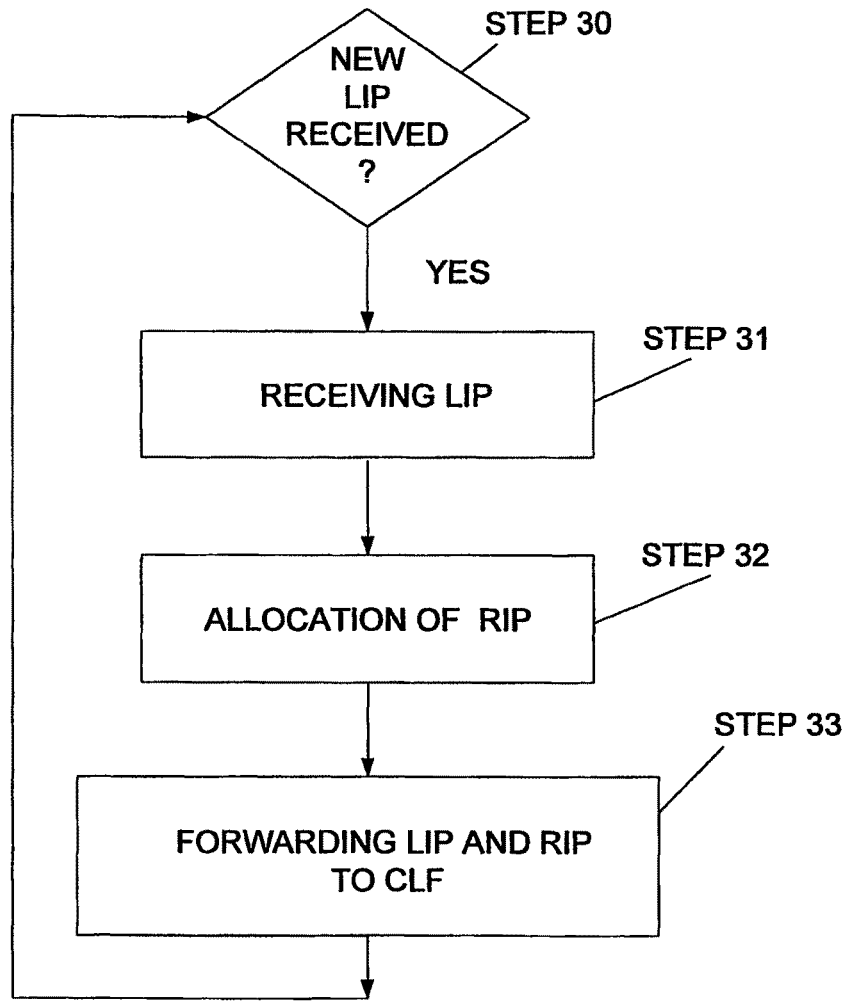
FIG. 5 is a flowchart diagram illustrating another embodiment of present invented method operating in the system architecture of FIG. 3.

In the first embodiment the Terminal Termination Function entity is a TTG 330. The TTG is configured to provide the CLF with the UE local IP (LIP) address as first source address and the UE remote IP (RIP) address as second source address. Said embodiment of the invented method is illustrated in a flowchart in FIG. 5. The method will wait for a new LIP to be received in step 30. The present embodiment of the invented method comprises further the following steps of:

receiving the UE's local IP address as source address when the IPsec tunnel is established (step 31);
allocation of the UE's remote IP address (step 32);
forwarding the local IP address and the remote IP address to the CLF as protocol element, e.g. in DHCP (ref3) or Radius (ref4), (step 33).

The allocation of the UE's remote IP address, step 32, is in the TTG embodiment accomplished when the PDP context create response is received. The method will wait for a new LIP to be received in step 30. When a LIP is received, the condition is fulfilled, "yes", and the method will restart with step 31.

Figure 6:
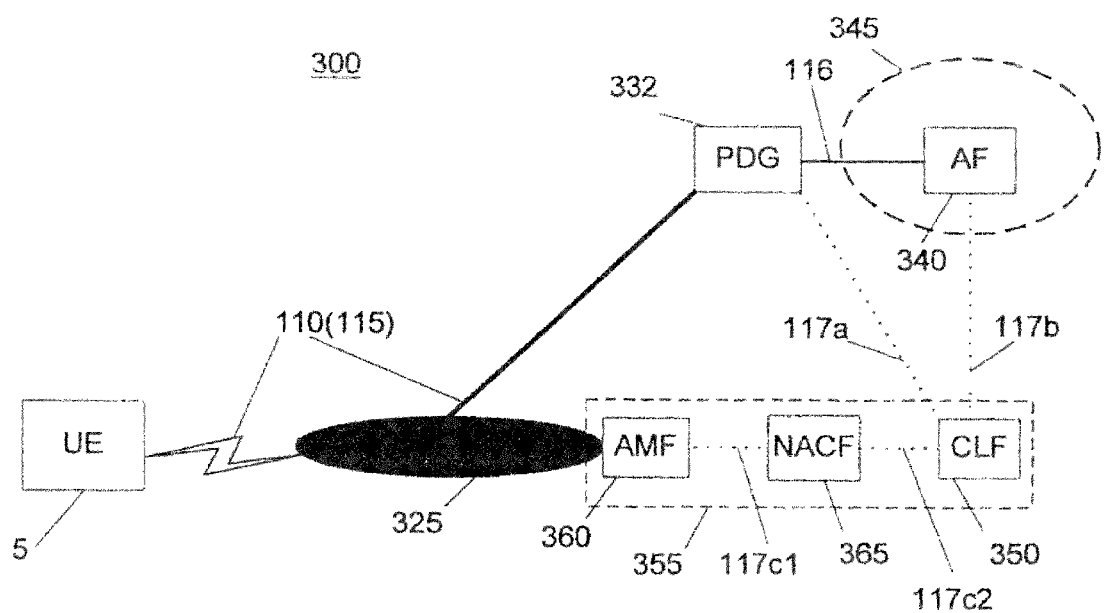
FIG. 6 is a block diagram illustrating a system architecture according to further another embodiment (PDG based) of the present invention.

In another embodiment of the Interworking WLAN system architecture 300, illustrated in FIG. 6, a Packet Data Gateway (see 30 in FIG. 1) is the TTF entity (see 130 in FIG. 2). As the PDG functionality is a combination of TTG and GGSN functionalities, the PDG 332 is able to interface the CLF 350 via signalling path 117a in the same way as the TTG described with reference to FIGS. 1, 2, and 3, and similar reference numbers indicates similar components and paths (or routes).

The Packet Data Gateway (PDG; 30 in FIG. 1) is here including the Tunnel Termination Function and reusing a subset of Gateway GPRS Support Node (GGSN) functions. For example, GGSN functions that are used may be:

Charging Gateway Interfaces;
IP address allocation;
Single access to 3GPP PS domain services.

The PDG is further described in Reference 2, e.g. chapter 6.2.6 and Annex F.5.

Consequently, the present invention also relates to a CLF configured for associating a first source address and a second source address in a tunneled IP network. The CLF is configured to receive the UE local IP (LIP) address as a first source address and a remote IP (RIP) address as a second source address. The CLF 350 is configured to perform the same steps according to the method described in FIG. 4, but in this embodiment the TTF is a PDG 332:

storing the LIP address and geographical information about the UE in the CLF as part of LIP address allocation according to TISPAN specified procedures (step 10);
receiving the LIP address and the RIP address as protocol element, e.g. in DHCP (ref3) or Radius (ref4), from one Tunnel Termination Function entity, i.e. the PDG node 332 (step 15);
identifying the stored LIP address by means of the received LIP address and associating/binding the received RIP address to the geographic information corresponding to the LIP address (step 20).

The CLF is configured to wait for a new LIP to be received in step 5. When a LIP is received, the condition is fulfilled, "yes", and the CLF is configured to restart the method with step 10.

As described in this embodiment, the TTG 330 is replaced by a PDG 332. Therefore, the PDG 332 is configured for providing the CLF of the tunneled IP network with a UE local IP address as first source address and a UE remote IP address as second source address. The PDG is configured to perform the same steps according to the method described with reference to FIG. 5. The Remote IP address allocation, step 32, is performed according Ref. 2, chapter 5.10.1.

Figure 7:
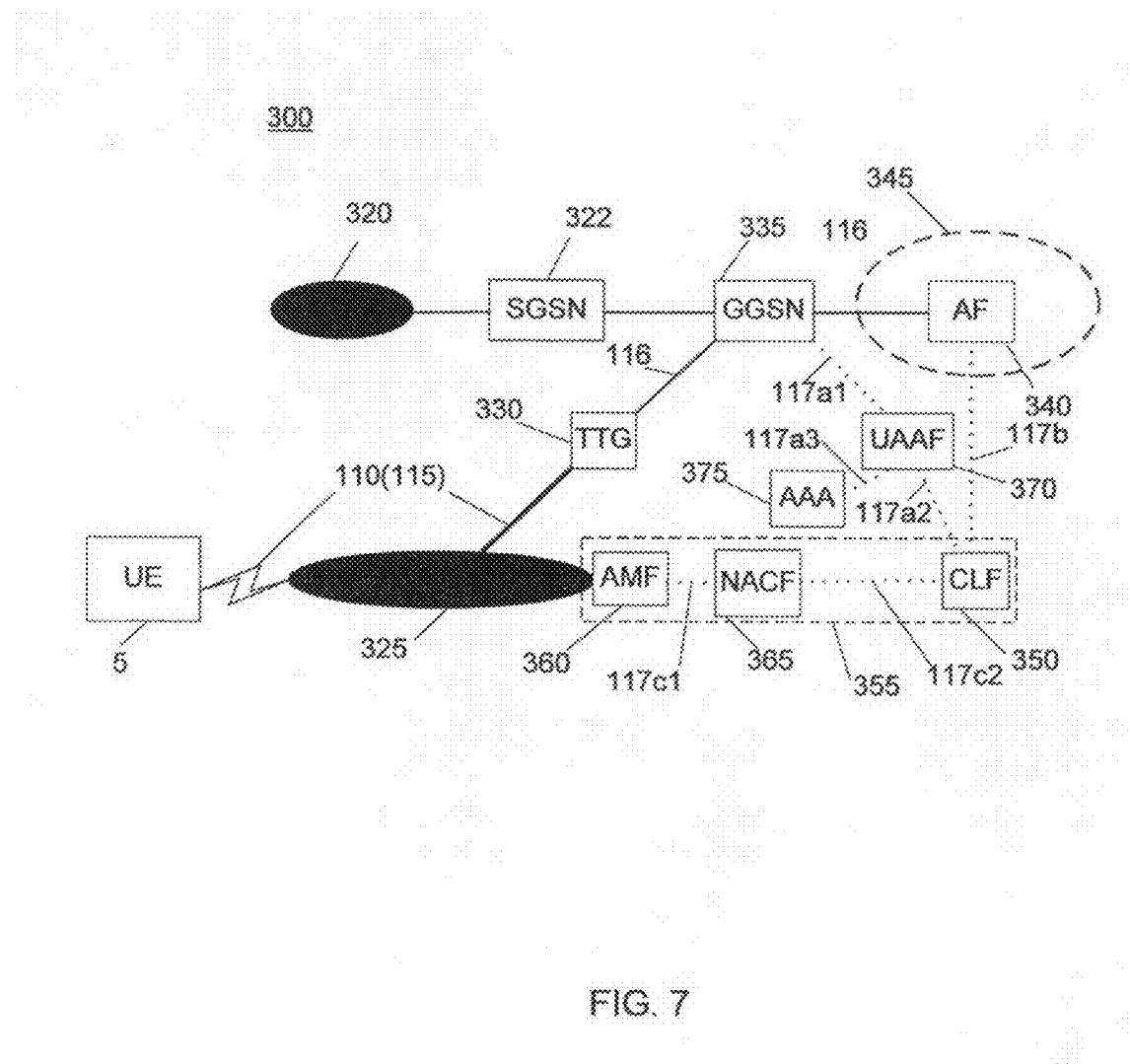
FIG. 7 is a block diagram illustrating a system architecture (GGSN based) according to yet another embodiment of the present invention.

FIG. 7 illustrates further one Interworking WLAN system architecture wherein further one embodiment of the present invention is applicable. The different nodes and functions of the illustrated system in FIG. 7 are similar to the nodes and functions of the embodiment FIG. 3, and similar reference numbers indicates similar components and paths (or routes). The main difference is that the GGSN 335 is configured to provide the CLF with the UE local IP address as first source address and the UE remote IP address as second source address via signalling path 117a, here established by way of paths 117a1 and 117a2. The GGSN will receive the UE's local IP address as a GPRS Tunneling Protocol Configuration Options (GTP PCO), or private extension, when the PDP context is established, and the GGSN is configured to forward the local IP address and the remote IP address via an UAAF proxy 370 to the CLF 350 as an attribute in e.g. a Radius protocol element.

The following system architecture requirements are provided according to the invention:

CLF can be accessed from service control subsystems (IMS) 345 and applications 340;
CLF uniquely gives one location based on tunneled/remote/PDP IP address (no overlapping (private) DSL IP addresses are allowed (DSL Digital Subscriber Line));

The CLF is extended to store remote IP address in connection with the corresponding local IP address;

The same operator runs the DSL (Digital Subscriber Line) network as the mobile network or there is a agreement to use CLF from both the mobile and DSL system.

The CLF is configured to receive the UE local IP (LIP) address as a first source address and the UE remote IP (RIP) address as second source address in accordance with the method, described above in FIG. 4. The present invented method comprises following steps of:

storing the LIP address and geographical information about the UE in CLF as part of LIP address allocation according to TISPAN specified procedures (step 10);

receiving the LIP address and the RIP address in a protocol, e.g. as a RADIUS protocol element, from a GGSN entity (step 15);

identifying the stored LIP address by means of the received LIP address and associating/binding the received RIP address to the geographic information about the UE corresponding to the LIP address (step 20).

The method will wait for a new LIP to be received in step 5. When a LIP is received, the condition is fulfilled, "yes", and the method will restart with step 20.

Figure 8:
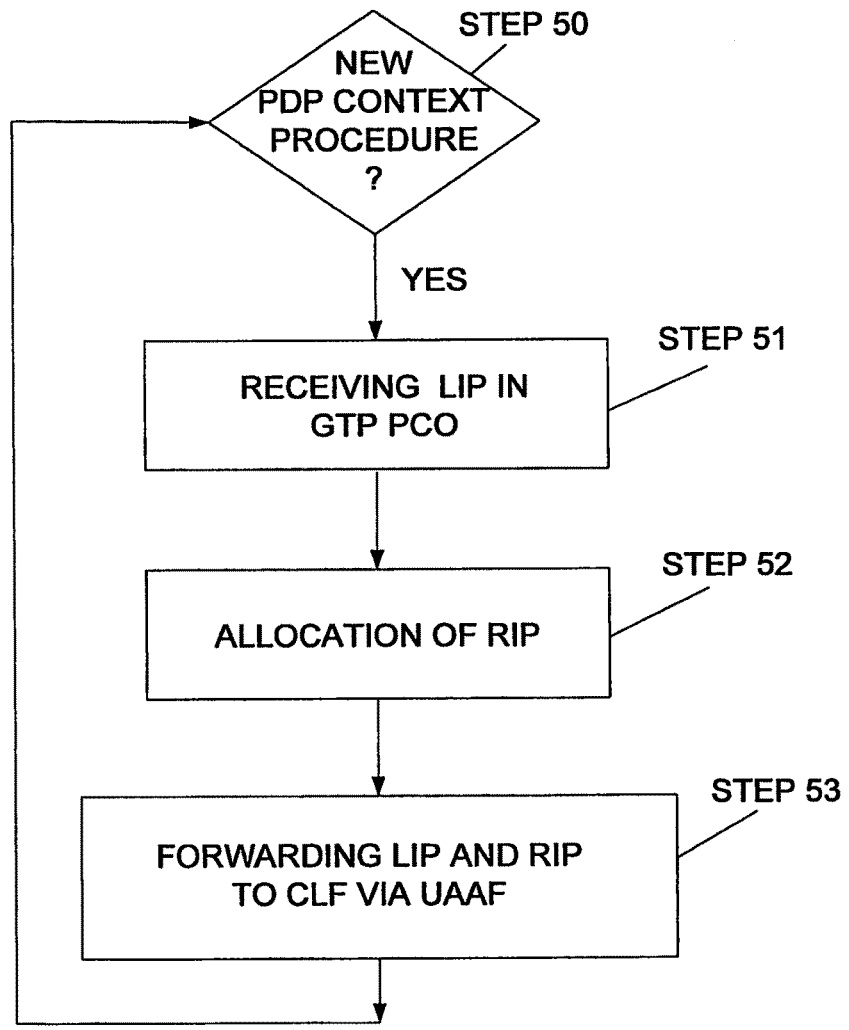
FIG. 8 is a flowchart diagram illustrating an embodiment of present invented method operating in the system architecture of FIG. 7.

If the Terminal Termination Function entity is in the TTG node entity, the following embodiment of the invented method is provided, wherein the GGSN is configured to provide the CLF with the UE local IP address as first source address and the UE remote IP address as second source address. The Remote IP address allocation is performed according to GGSN standard procedures described in e.g. Reference 5, chapter 9.2.1. The present embodiment of the invented method is illustrated in a flowchart in FIG. 8. The method will wait for a new PDP context set up procedure to be performed in step 50. When a LIP is received, the condition is fulfilled, "yes", and the method will continue with the following steps of:

receiving the UE's LIP address as a GTP PCO, or private extension when the PDP context is established (step 51);

Allocation of the UE's RIP address (step 52);

forwarding the LIP address and the remote IP address via an UAAF proxy to the CLF as an attribute in for example a Radius protocol element, (step 53).

The method will wait for a new PDP context set up procedure to be performed in step 50. When a LIP is received, the condition is fulfilled, "yes", and the method will restart with step 50.

Further, the Remote IP address allocation, step 52, is performed according to GGSN standard procedures described in e.g. Reference 5, chapter 9.2.1.

By the described embodiments, it is obvious to a skilled person how to solve the problem that there is no binding/associating/correlation of the local IP address and its associated geographical information to the WLAN UE remote IP address in the case of a WLAN UE that is attached via an I-WLAN to another IP network or Internet.

It is shown that the present invention gives a solution for location support, needed e.g. for emergency calls, for IMS in combination with 3GPP IP Access/Interworking WLAN.

The invention may be implemented in digital electronically circuitry, or in computer hardware, firmware, software, or in combinations of them. Apparatus of the invention, located in nodes and entities of the system and networks, may be implemented in a computer program product tangibly embodied in a machine readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such internal hard disks and removable disks; magneto-optical disks; and CD-ROM disks. Any of the foregoing may be supplemented by, or incorporated in, specially—designed ASICs (Application Specific Integrated Circuits).

Figure 9:
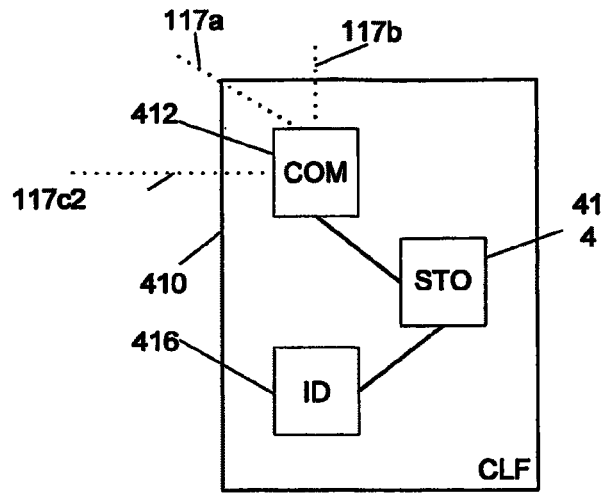
FIG. 9 is a block diagram schematically illustrating an embodiment of a Connectivity session Location and repository Function (CLF) means according to the invention.

FIG. 9 presents an embodiment of a Connectivity session Location and repository Function (CLF) means 410 according to the invention. Said CLF 410 is configured for associating a first source address and a second source address. The CLF means 410 is configured to receive the User Equipment's (UE's) 5 (not shown) local IP address as a first source address and a remote IP address for said UE as a second source address via signalling path 117a. It has a storage 414 for storing the local IP address and geographical information in the CLF means as part of local IP address allocation. The CLF is also provided with communication means 412 for receiving the local IP address and the remote IP address from another node, which comprises one Tunnel Termination Function (TTF) entity via a connection 117a and to allocate geographical data information according to TISPAN specified procedures. The CLF registers the association between the IP address allocated to the UE and related network location information provided by the NACF 365 of the NASS system 355 (see e.g. FIG. 3). The CLF registers the association between network location information received from the NACF and geographical location information. The CLF 350 responds to location queries from service control subsystems 345 and applications 340. The actual information delivered by the CLF may take various forms, e.g. network location, geographical coordinates, post mail address etc. The CLF interfaces with the NACF 365 via path 117c2 to get the association between the local IP address allocated by the NACF to the end UE and the Line ID. For more details, see Reference 1, e.g. chapter 5.2.3. Further, the CLF means 410 is provided with means 416 for identifying the stored local IP address by means of the received local IP address and associating/binding the received remote IP address to the geographic information corresponding to the stored local IP address. The CLF 410 is configured to respond to location queries from service control subsystems and applications. The actual information delivered by the CLF may take various forms, e.g. network location, geographical coordinates, post mail address etc. The dotted lines connected to the communication means in FIG. 9 illustrate the signalling paths 117a, 117b, 117c2 to the NACF, a TTG, GGSN or PDG, and an application function requesting information from the CLF entity.

The TTF may be situated in a Tunnel Termination Gateway (TTG) entity, and the CLF means is configured to receive the local IP address and remote IP address from the TTG in a Radius (a4), DHCP (a2) or other protocol.

In another embodiment, the CLF means is configured to receive the local IP address and remote IP address from a Gateway GPRS Support Node (GGSN) entity/node 335 via an UAAF proxy 370 in a Radius (a4) protocol or other protocol.

According to another embodiment, the TTF may be situated in a Packet Data Gateway (PDG), and the CLF means is configured to receive the local IP address and remote IP address in a Radius (a4), DHCP (a2) or other protocol from said PDG.

Figure 10:
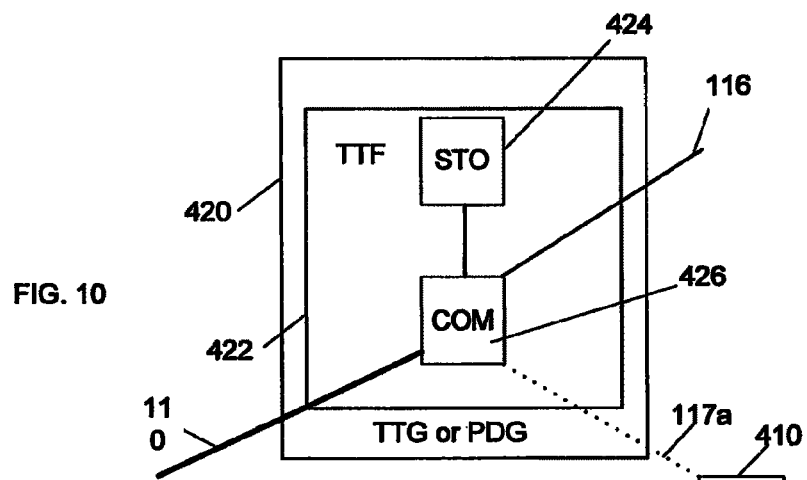
FIG. 10 is a block diagram schematically illustrating a Tunnel Termination Function node according to one embodiment of the invention.

In FIG. 10, a Tunnel Termination Function (TTF) node 420 is provided according to one embodiment of the invention. The TTF 420 comprises Tunnel Termination Function (TTF) means 422 for providing a Connectivity session Location and repository Function (CLF) means 410 with a User Equipment's (UE's) local IP address as first source address and a remote IP address for said UE as second source address via signalling path 117a. The TTF means is configured with communication means 426 for receiving the UE's local IP address as source address when the IPsec tunnel 110 is established, and for allocation of the UE's remote IP address, and for forwarding the local IP address and the remote IP address to the CLF in at least one protocol. The TTF may also be provided with a storage means for storing IP addresses and other information to be transmitted or processed in by the entity. The TTF 420 routes data packet traffic on different routes, here illustrated as paths 110 and 116.

The TTF node is configured to forward the local IP address and remote IP to the CLF in a Radius (a4), DHCP (a2) or other protocol to the CLF.

In one embodiment, the TTF node is a TTG node, and in a second embodiment, the TTF node is implemented as a Packet Data Gateway (PDG) 332.

Figure 11:
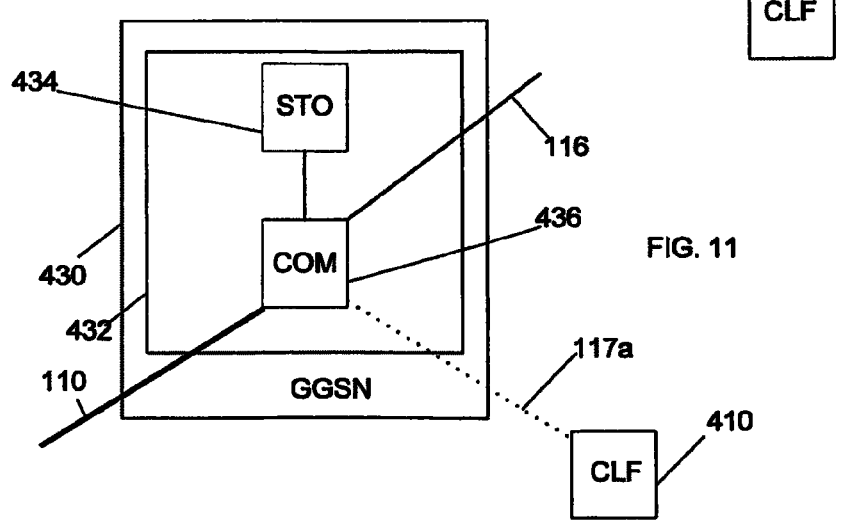
FIG. 11 is a block diagram schematically illustrating a Gateway GPRS Support Node (GGSN) node according the invention.

In FIG. 11, Gateway GPRS Support Node (GGSN) node (335) 430 according the invention is illustrated. The GGSN comprises a means 432 for providing a Connectivity session Location and repository Function (CLF) 410 of a tunneled IP network with a User Equipment's (UE's) local IP address as first source address and a remote IP address for the UE as second source address. The means 432 is also configured with communication means 436 for receiving the UE's local IP address as source address when the IPsec tunnel is established, for allocation of the UE's remote IP address, and forwarding the local IP address and the remote IP address to the CLF means in at least one protocol. The means 432 in the GGSN may also be provided with a storage means 434 for storing IP addresses and other information to be transmitted or processed in by the entity. The GGSN 430 routes data packet traffic on different routes, here illustrated as paths 110 and 116.

The above described embodiments of the invention provides a favourable method for determination of the location of an attached User Equipment in a tunneled IP network. The User Equipment location can therefore be determined by means of procedures that are equal or similar to the procedures described in TISPAN NASS and maintained in a Location Function (LF), such as a Connectivity session Location and repository Function (CLF).

Figure 12:
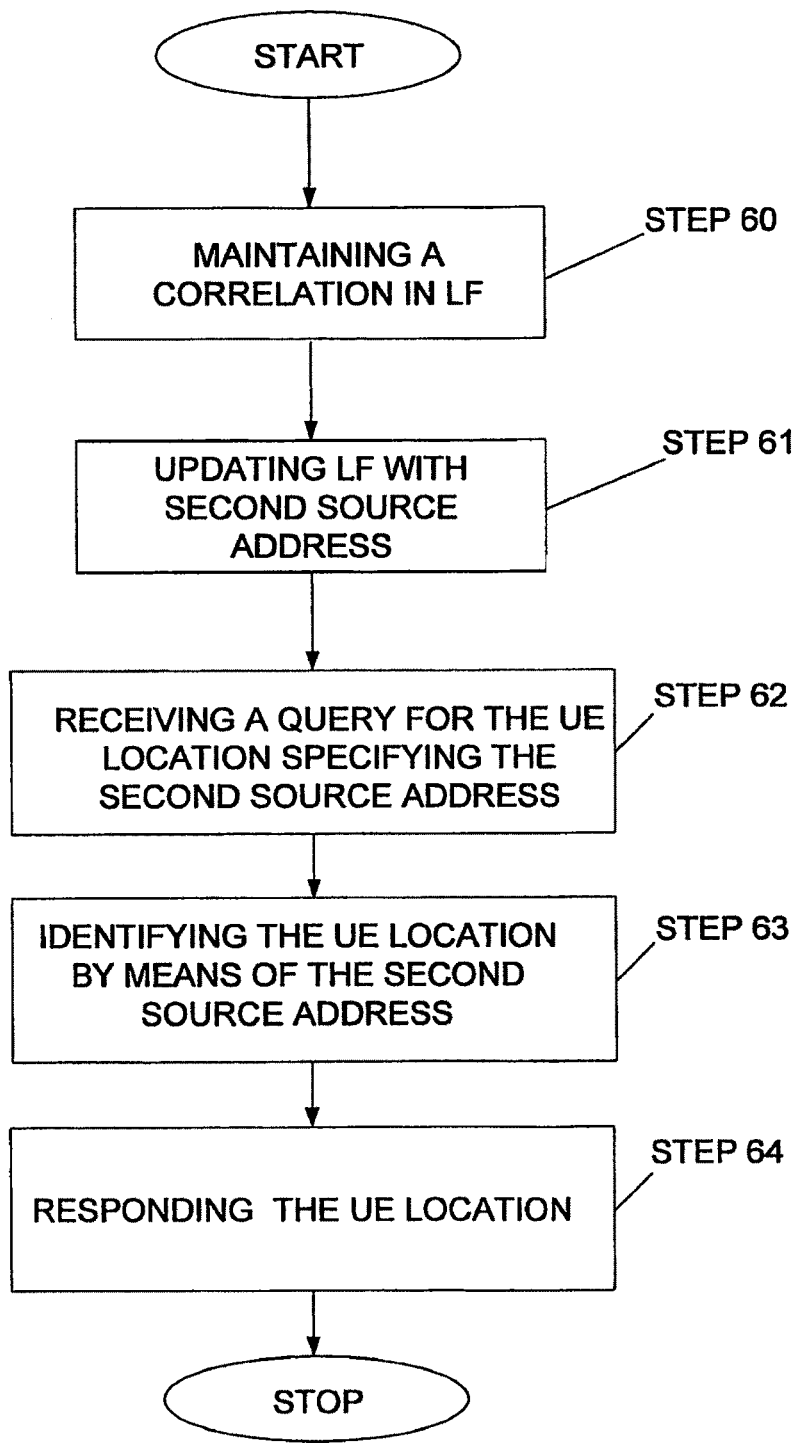
FIG. 12 is a flowchart diagram illustrating the invented method for determining a User Equipment's location.

In FIG. 12, the invented method for determining the location is illustrated. The first step of the method is to maintaining a correlation in the Location Function between the user equipment and a first source address of the User Equipment in a first IP network. The maintaining step is followed by a step of updating the Location Function with a second source address of the user equipment in a second IP network in context of the first source address so that the Location Function can correlate the first source address with the second source address. The two previous steps will provide the possibility of querying the Location Function for the User Equipment location by using the second source address as a key. Therefore, the LF is configured for performing the next steps of the determination method. The querying comprises a step of receiving a query for the UE location specifying the second source address, followed by the step of identifying the UE location by means of the second source address, and the step of responding the requested location, i.e. geographic information for the UE, to the entity or function, e.g. an application function, sending the query.

The first and second source addresses may be, as described above, the local IP address (LIP) and the remote IP address (RIP), respectively.

If the tunneled IP network is provided with a tunnel termination function (TTF), said TTF is configured to perform the step of updating the Location Function with a second source address of the user equipment in a second IP network in context of the first source address so that the Location Function can correlate the first source address with the second source address.

The advantage with this invention is that an existing fixed network positioning solution based on a Connectivity Session Location and Repository Function (CLF) can be used also when IP traffic is tunneled to an application server. An additional advantage is that no additional terminal functions, such as Global Positioning System (GPS) support, are needed.

A number of embodiments of the present invention have been described. It will be understood that various modifications may be made without departing from the scope of the invention. Therefore, other implementations are within the scope of the following claims defining the invention.

REFERENCE LIST

Reference 1 (Ref.1) ETSI ES 282 004 v1.1.1 (2006-6)
Reference 2 (Ref.2) 3GPP TS 23.234 V7.5.0 (2007):
Reference 3 (Ref.3) IETF (Internet Engineering Task Force) RFC 2131;
Reference 4 (ref.4) IETF RFC 2865;
Reference 5 (ref.5) 3GPP TS 23.060 V5.2.0 (2002-06).

The invention claimed is:

1. A method for determination of the location of an attached User Equipment in a tunneled IP network by means of a second source address, said tunneled IP network comprising a tunnel termination function whereby the User Equipment location has been determined and maintained in a Location Function and the method comprises the steps of:
maintaining in the Location Function a correlation between the User Equipment and a first source address of the User Equipment in a first IP network through which an IP tunnel has been established into a second IP network thereby constituting a tunneled IP network;
updating by means of the tunnel termination function the Location Function with a second source address of the User Equipment in the second IP network in context of the first source address, whereby the Location Function is adapted to correlate the first source address with the second source address; and
querying the Location Function for the User Equipment location and retrieving the User Equipment location by using the second source address as a key.

2. The method of claim 1, wherein the User Equipment location has been determined by means of TISPAN NASS (Telecommunications and Internet converged Services and Protocols for Advanced Networking (TISPAN) Network Attachment Sub-System (NASS)) standard procedures.

3. A method for associating a first source address and a second source address in a tunneled IP network comprising a Connectivity session Location and repository Function (CLF) that is configured to receive a local IP address of a User Equipment (UE) as a first source address, wherein the CLF is further configured to receive a remote IP address as a second source address for said UE, wherein the method comprises the steps of:
- storing the local IP address and corresponding geographical information in the CLF as part of local IP address allocation according to Telecommunications and Internet converged Services and Protocols for Advanced Networking (TISPAN) specified procedures;
- receiving the local IP address and the remote IP address; and
- identifying the stored local IP address corresponding to the received local IP address and binding the received remote IP address to the geographic information corresponding to the stored local IP address.

4. The method of claim 3, wherein a Tunnel Termination Function (TTF) entity is configured in a Tunnel Termination Gateway (TTG) entity and the local IP address and remote IP address are received from the TTG in a protocol.

5. The method of claim 3, wherein the local IP address and remote IP address are received from a Gateway GPRS Support Node (GGSN) entity via a User Access Authorization Function (UAAF) proxy in a protocol.

6. The method of claim 3, wherein a Tunnel Termination Function (TTF) entity is configured in a Packet Data Gateway (PDG) entity, and the local IP address and remote IP address are received from the PDG in a protocol.

7. A method for providing a Connectivity session Location and repository Function (CLF) of a tunneled IP network with the local IP address of a User Equipment (UE) as a first source address and a remote IP address as a second source address for said UE from a Tunnel Termination Function (TTF), wherein the method comprises the steps of:
- receiving the local IP address of the UE as a source address when the IPsec Tunnel is established;
- allocating the remote IP address of the UE; and
- forwarding the local IP address and the remote IP address to the CLF in at least one protocol to allow the CLF to correlate the local IP address, the remote IP address, and location information for the UE.

8. The method of claim 7, wherein the TTF is a Tunnel Termination Gateway (TTG) node, and the step of allocating the remote IP address of the UE is accomplished as receiving the remote IP address of the UE in the PDP context create response, and the local IP address and remote IP address are forwarded by the TTF in the TTG node to the CLF in a Radius, DHCP or other protocol.

9. The method of claim 7, wherein the local IP address and remote IP address are forwarded by the TTF in a Packet Data Gateway (PDG) node to the CLF in a Radius, DHCP or other protocol.

10. A method for providing a Connectivity session Location and repository Function (CLF) of a tunneled IP network with the local IP (LIP) address of a User Equipment (UE) as a first source address and a remote IP (RIP) address as a second source address for said UE from a Gateway GPRS Support Node (GGSN), wherein the method comprises the steps of:
- receiving the LIP address of the UE as a GPRS Tunneling Protocol Configuration Options (GTP PCOL) or private extension when the PDP context is established;
- allocating the RIP address of the UE; and
- forwarding the LIP address and the RIP address to the CLF in a protocol to allow the CLF to correlate the LIP address, the RIP address, and location information for the UE.

11. The method of claim 10, wherein the local IP address and remote IP address are forwarded from the GGSN node and via a UAAF proxy in a protocol to the CLF.

12. A Connectivity session Location and repository Function (CLF) entity configured for associating a second source address in a tunneled IP network with the geographic information corresponding to a first source address, wherein the CLF is configured to receive a local IP address of a User Equipment (UE) as a first source address and a remote IP address for said UE as a second source address, said CLF comprising:
- storage for storing the local IP address and geographical information corresponding to the local IP address in the CLF as part of local IP address allocation;
- a communication interface for receiving the local IP address and the remote IP address; and
- a processor for identifying the stored local IP address corresponding to the received local IP address and binding the received remote IP address to the geographic information corresponding to the stored local IP address.

13. The CLF of claim 12, wherein the CLF is configured to receive the local IP address and remote IP address in a Radius, DHCP or other protocol from a Tunnel Termination Function (TTF) situated in a Tunnel Termination Gateway (TTG) entity.

14. The CLF of claim 12, wherein the CLF is configured to receive the local IP address and remote IP address from a Gateway GPRS Support Node (GGSN) entity via an User Access Authorization Function (UAAF) proxy in a protocol.

15. The CLF of claim 12, wherein the CLF is configured to receive the local IP address and remote IP address in a protocol from a TTF situated in a Packet Data Gateway (PDG) entity.

16. A Tunnel Termination Function (TTF) entity configured for providing a Connectivity session Location and repository Function (CLF) entity of a tunneled IP network with a local IP address of a User Equipment (UE) as a first source address and a remote IP address for said UE as a second source address, wherein the TTF comprises:
- a communication interface for receiving the local IP address of the UE as the first source address when the IPsec tunnel is established;
- a processor for allocation of the remote IP address of the UE;
- a communication interface for forwarding the local IP address and the remote IP address to the CLF as said first and second source addresses, in accordance with a protocol to allow the CLF to correlate the local IP address, the remote IP address, and location information for the UE.

17. The TTF of claim 16, wherein the TTF entity is either Tunnel Termination Gateway (TTG) node or a Packet Data Gateway (PDG) node, and wherein the node is configured to forward the local IP address and remote IP address to the CLF in a protocol.

18. A Gateway GPRS Support node (GGSN) entity configured for providing a Connectivity session Location and repository Function (CLF) of a tunneled IP network with a local IP address of a User Equipment (UE) as a first source address and a remote IP address for the UE as a second source address, wherein the GGSN comprises:
- a communication interface for receiving the local IP address of the UE as said first source address when the IPsec tunnel is established;
- a processor for allocation of the UE's remote IP address; and
- a communication interface for forwarding the local IP address and the remote IP address to the CLF as said first and second source addresses, in accordance with a protocol to allow the CLF to correlate the local IP address, the remote IP address, and location information for the UE.

19. A method for determination of the location of an attached User Equipment (UE) in a tunneled IP network by means of a second source address, whereby the location of the UE has been determined and maintained in a Location Function (LF), and wherein the method comprises the steps of:
- maintaining a correlation in the LF between the UE and a first source address of the UE in a first IP network through which an IP tunnel has been established into a second IP network thereby constituting the tunneled IP network;
- updating the LF with a second source address of the UE in the second IP network in context of the first source address, so that the LF can correlate the first source address with the second source address; and
- querying the LF for the location of the UE by using the second source address as a key.

20. The method of claim 19, wherein the location of the UE is determined using TISPAN NASS (Telecommunications and Internet converged Services and Protocols for Advanced Networking (TISPAN) Network Attachment Sub-System (NASS)) standard procedures.

21. The method of claim 19, wherein the step of querying the LF for the location of the UE comprises the steps of:
- receiving a query for the location of the UE, said query specifying the second source address;
- identifying the location of the UE based on the second source address; and
- sending location information for the identified location of the UE to the entity or function sending the query.

22. The method of claim 19, wherein said tunneled IP network is provided with a Tunnel Termination Function (TTF) which is configured for performing the step of updating the LF with the second source address of the UE in the second IP network in context of the first source address, so that the LF can correlate the first source address with the second source address.

23. The method of claim 19, wherein the first and second source addresses are the local IP (LIP) address and the remote IP (RIP) address, respectively, of the UE.

* * * * *